Nov. 5, 1940.    K. B. BLODGETT    2,220,862
LOW-REFLECTANCE GLASS
Filed April 28, 1939
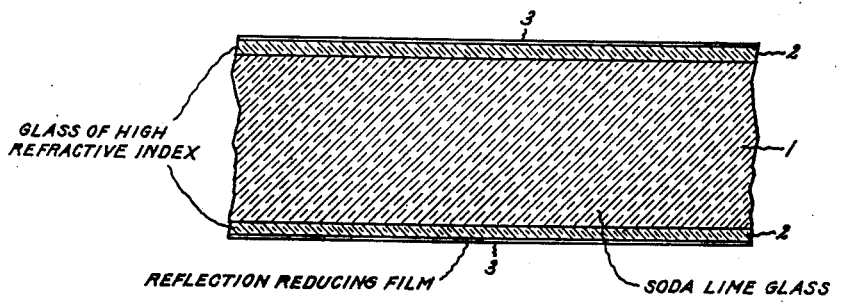
Inventor:
Katharine B. Blodgett,
by Harry E. Dunham
His Attorney.

Patented Nov. 5, 1940

2,220,862

UNITED STATES PATENT OFFICE 2,220,862

LOW-REFLECTANCE GLASS

Katharine B. Blodgett, Schenectady, N. Y., assignor to General Electric Company, a corporation of New York Application April 28, 1939, Serial No. 270,586

3 Claims. (Cl. 88—1)

The present invention relates to a new form of low-reflectance glass and to a method for producing the same.

It is one object of the invention to provide a glass comparable in strength and lightness with ordinary window glass but characterized by a reflectivity materially lower than that of glasses now commercially available. This object is accomplished, as will be explained more fully hereinafter, by covering a base member of soda-lime glass with a layer of a second glass which contains a metallic constituent of such character as to impart a relatively high refractive power to the second glass. The layer is then etched or otherwise treated superficially to remove the metallic constituent to a depth which corresponds approximately to a quarter wavelength of some component of visible light. The beneficial effects of this mode of treatment will be described in the following.

The features which I desire to protect herein are pointed out in the appended claims. The invention itself, together with certain objects and advantages thereof, may best be understood by reference to the following description taken in connection with the drawing, in which the single figure is a sectional view of a transparent body employing the invention.

As is explained in an article by K. B. Blodgett appearing at page 391 of the Physical Review for February 15, 1939, the reflectivity of a transparent body may be decreased by providing on the surface of the body a film having a refractive index between that of the body and that of air and having a thickness approximately equal to a quarter wavelength of visible light. However, in connection with soda-lime glass, such as ordinary window glass, difficulty is experienced in providing a film of the desired character which will be sufficiently durable to permit use of the treated glass in an exposed condition. Surface etching by means of alkalis or steam treatment has a tendency to reduce the refractive index in the desired manner but produces a frosted appearance of the glass and thus destroys its utility from an optical standpoint. My invention involves a means for modifying soda-lime glass in such a way as materially to reduce its surface reflectivity while retaining its desirable mechanical properties of lightness and strength.

This is accomplished by applying to the surface of a body of soda-lime glass a second glass which contains a metal whose presence imparts a relatively high refractive index to the glass. Such a second glass may consist, for example, of lead silicate glass, a lead borosilicate glass, or a barium glass, these glasses being readily available in commercial form. Other glasses of high refractive index such as uranium glass may be alternatively employed, although their use is not preferred because of the cost element involved.

The "second glass" may be applied only as a relatively thin layer so that its presence need not materially affect the weight of the soda-lime glass base member. For instance, a thickness on the order of five microns will be sufficient, although a greater thickness may be employed if desired. The second glass may be applied, for instance, by fusing it to the base glass in any desired manner. If the fusion results in the production of surface irregularities these may be removed by suitable polishing means.

Unlike silica-lime glass, glasses such as barium and lead glass may readily be etched to produce a surface film of low refractive index and high mechanical strength. For example, a lead glass having a refractive index on the order of 1.6 may be treated with nitric acid to produce a superficial film having a refractive index on the order of 1.4. In this connection it is believed that the effect of the etching procedure is to remove the metallic component of the glass (lead) leaving a film which consists mainly of a somewhat porous silica structure. Such structure is sufficiently strong to withstand abrasion and has little or no tendency to cause diffusion of impinging light rays. On the other hand, if its thickness is properly controlled, its presence will produce interference effects of such character as materially to reduce light loss by reflection. A particular etching procedure which has been found to give satisfactory results in this connection includes the step of immersing the part to be etched in a 1% solution of nitric acid at about 50 degrees C. The depth of the etching is a function of the time of immersion and may be gauged by visible observation. For most purposes, optimum results are obtained when the thickness of the film is such as to give the glass a slightly purple tinge when viewed in white light. This condition occurs when the optical thickness of the etched film corresponds to a quarter of the wavelength of yellow light so that the reflection of light of this color is substantially avoided. Components of colors other than yellow are reflected in varying degrees although the reflection of all components is substantially reduced.

The structural aspects of the invention are illustrated in the single figure of the drawing in which there is shown a relatively thick layer 1 of soda-lime glass treated in the manner described above. It will be noted that both major surfaces of the part 1 are provided with a thin layer of a second glass 2, this being preferably a lead or barium glass as specified in the foregoing. Near the outer boundary of the layer 2 there is provided a superficial film 3, formed by the elimination (e. g. etching out) of the metallic component of the lead of barium glass. In the drawing the thickness of this film is considerably exaggerated for the purposes of clarity. Its actual thickness may be on the order of one-tenth micron.

It may be assumed that the lead glass has a refractive index on the order of 1.7. After etching, the portion of the layer which has been affected may be characterized by an index on the order of 1.4 or less. Under these circumstances, the etching treatment serves to reduce the reflection from the two surfaces of the body from 11% to about 2.5%.

Glass treated in the manner specified is considered to have special utility when incorporated in viewing windows and the like where glare, due to reflection, is strongly objectionable. It may also be advantageously employed in the production of metal-backed glass mirrors where the reflection of light from the outer surface of the glass is troublesome.

While I have described the invention in connection with a particular embodiment thereof, it will be understood that numerous modifications may be made by those skilled in the art without departing from the invention. I, therefore, aim in the appended claims to cover all such equivalent variations as come within the true spirit and scope of the foregoing disclosure.

What I claim as new and desire to secure by Letters Patent of the United States is:

1. As a new article of manufacture, a body of soda-lime glass provided superficially with a relatively thin layer of a second glass containing a metallic constituent which imparts a relatively high refractive power to the second glass, said layer being etched superficially to remove said constituent to a depth corresponding approximately to a quarter wavelength of some compent of visible light whereby the reflectivity of the article as a whole is materially reduced.

2. The method of improving the optical properties of a body of soda-lime glass which comprises fusing to such body a surface layer of a second glass containing a metallic constituent which imparts a high refractive power to the second glass, and then superficially etching the said second glass to remove the said metallic constituent to a depth corresponding approximately to a quarter wavelength of some component of visible light.

3. As a new article of manufacture, a body of soda-lime glass provided superficially with a relatively thin layer of a second glass containing a substantial quantity of a metallic constituent of the class consisting of barium and lead, said layer being superficially freed of the said constituent to a depth corresponding approximately to a quarter wave length of some component of visible light whereby the reflectivity of the article as a whole is materially reduced.

KATHARINE B. BLODGETT.